United States Patent [19]

Delisle

[11] Patent Number: 5,595,411
[45] Date of Patent: Jan. 21, 1997

[54] ACCESSORIES FOR LOG HAULING APPARATUS

[76] Inventor: Real Delisle, 390 rue du Centenaire, St-Thecle, Quebec, Canada, G0X 3G0

[21] Appl. No.: 521,917

[22] Filed: Aug. 31, 1995

[30] Foreign Application Priority Data

Apr. 26, 1995 [CA] Canada ................................... 2147945

[51] Int. Cl.⁶ ............................. B66C 1/14; F16G 11/14
[52] U.S. Cl. ........................................ 294/74; 294/82.14
[58] Field of Search ..................................... 294/74, 82.11, 294/82.14; 403/353; 24/115 R, 128, 132 R

[56] References Cited

U.S. PATENT DOCUMENTS

| | | | |
|---|---|---|---|
| 841,726 | 1/1907 | Shaw | 294/74 |
| 3,069,738 | 12/1962 | Nelson | 294/74 |
| 4,185,863 | 1/1980 | Larson et al. | 294/74 |
| 4,188,141 | 2/1980 | Stoot | 294/82.14 |
| 4,653,792 | 3/1987 | Sword | 294/82.14 |

FOREIGN PATENT DOCUMENTS

| | | | |
|---|---|---|---|
| 462383 | 1/1950 | Canada | 294/82.14 |
| 1107788 | 8/1981 | Canada | 294/82.14 |

*Primary Examiner*—Dean Kramer
*Attorney, Agent, or Firm*—Eric Fincham

[57] ABSTRACT

The present invention relates to an apparatus or attachment system for use in hauling logs in remote locations, the apparatus comprising a main line having a plurality of choker lines connected thereto, a connecting member connecting each choker member to the main line, each of the connecting members having a pulley at one end thereof adapted to run along the main line and with each of the connecting members having a shaft and an opposed end thereof to receive the choker lines which have a terminating member adapted to connect to the shaft to be pivotable thereabout.

5 Claims, 4 Drawing Sheets

ACCESSORIES FOR LOG HAULING APPARATUS

BACKGROUND OF THE INVENTION

The present invention relates to an apparatus or attachment system for use in a log hauling system.

During normal forestry operations, trees are selectively felled and then equipment is brought in to transport the fallen trees from their location to a more central location for further transport or processing. For purposes of transporting the trees from their location where they are felled, log transporting vehicles using a line with a winch are employed. These vehicles will typically transport anywhere between 10 to 50 trees.

Normally, the vehicles will lay out a main line to which a plurality of choker lines are attached. The choker lines will then be secured around one or more trees. The main line is then winched in and the trees transported to the desired site for processing or further transport.

As will be appreciated, with the weight of the felled trees there are substantial forces involved and breakage of lines is a frequent occurrence. The location and operating conditions such as weather wherein the machines operate is far from ideal. In northern climates, the trees are frequently felled during the winter months and breakage of the choker lines and problems with the main line can result in considerable lost time by the operator. Since the locations are frequently remote, the operator must carry all the necessary equipment to make any repairs at the site.

SUMMARY OF THE INVENTION

It is an object of the present invention to provide an improved apparatus or system for the hauling of logs, which apparatus or system minimizes line breakage.

According to one aspect of the present invention, there is provided an apparatus for a log hauling system, the apparatus comprising a main line, a plurality of choker lines, a plurality of connecting members, each connecting member connecting a choker line to the main line, each of the connecting members having a pulley at one end thereof adapted to run along said main line, each of said connecting members having a shaft at an opposed end thereof, each of the choker lines having a terminating member adapted to connect to the shaft and be pivotable thereabout, the choker line being rotatable with respect to the terminating member.

In a preferred embodiment of the present invention, there is provided an end member which is adapted to go about the distal end of the main line. In this respect, it is conventional in the art to form a knot at the distal end of the end line and place a end piece thereat. Naturally, the end piece is under tremendous forces since as the logs are hauled in, all the pressure is exerted against the end piece. Frequently, the breakage of the end piece will cause a loss of all of the choker lines. When the line gives or breaks, the operator must again reform the knot and attach another end piece.

According to the present invention, the end piece is arranged so as to receive a choker line thereon. Thus, when the breakage of the line occurs, the end piece is readily located since it is attached to a choker line which is more visible.

Preferably, the connecting member is made so as to have a relatively short length from one end to the other. This is important during the hauling procedure as it permits the logs to be lifted to a greater height.

The connecting member may comprise a trunnion arrangement to which the choker line is interconnected. Again, as previously mentioned, the shorter length of this connection is desirable.

The arrangement of the present invention provides for substantially less stress on the lines and accordingly, will provide a substantially longer life span and have less downtime.

Having thus generally described the invention, reference will be made to the accompanying drawings illustrating an embodiment thereof, in which:

DESCRIPTION OF THE PREFERRED EMBODIMENTS

Figure 1:
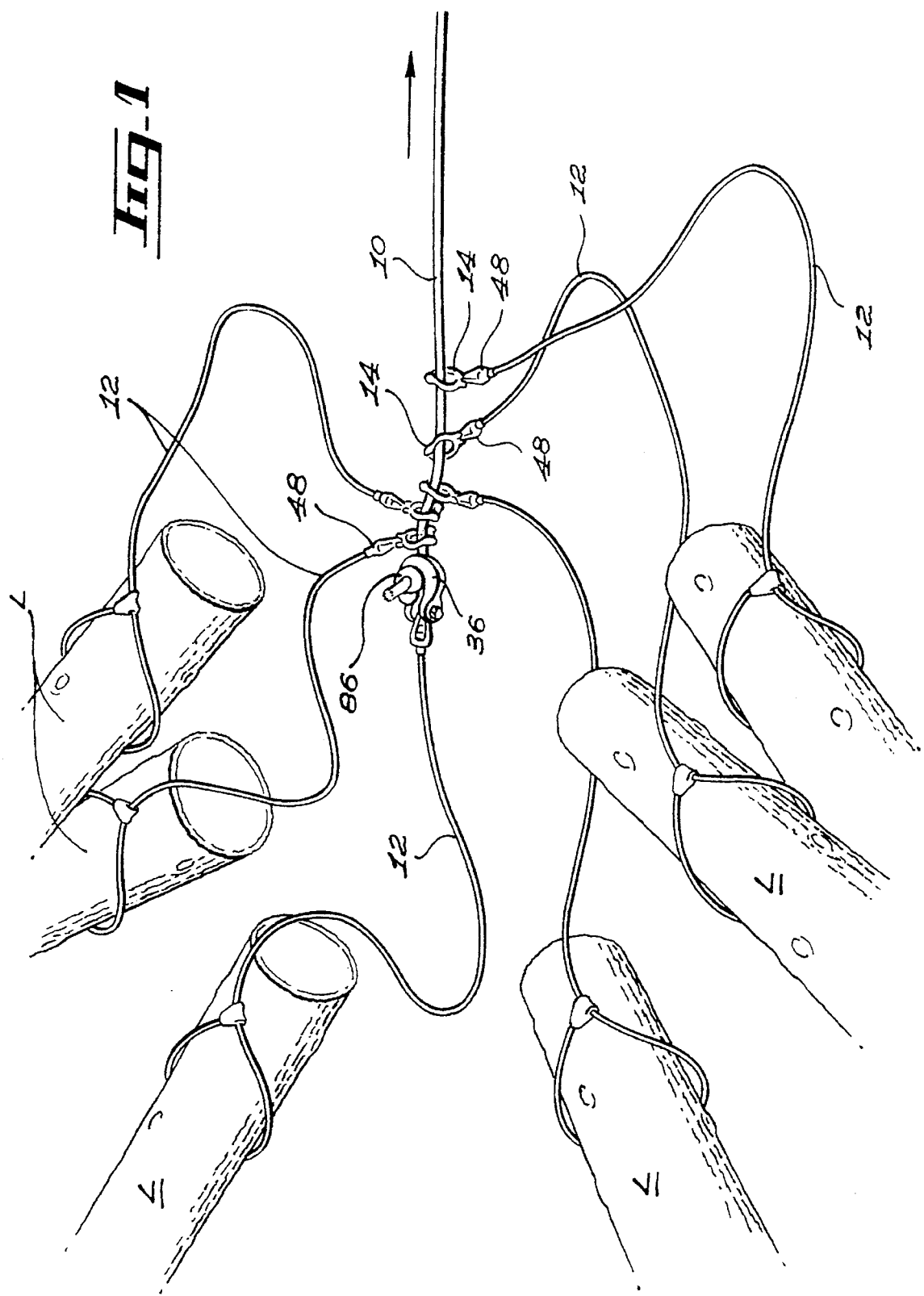
FIG. 1 is a perspective view of a log hauling system.

Referring to the drawings in greater detail and by reference characters thereto, there is illustrated a log hauling system which includes a main line 10 to which are attached a plurality of choker lines generally designated by reference numeral 12. Choker lines 12 in turn are secured about felled trees or logs L.

Figure 5:
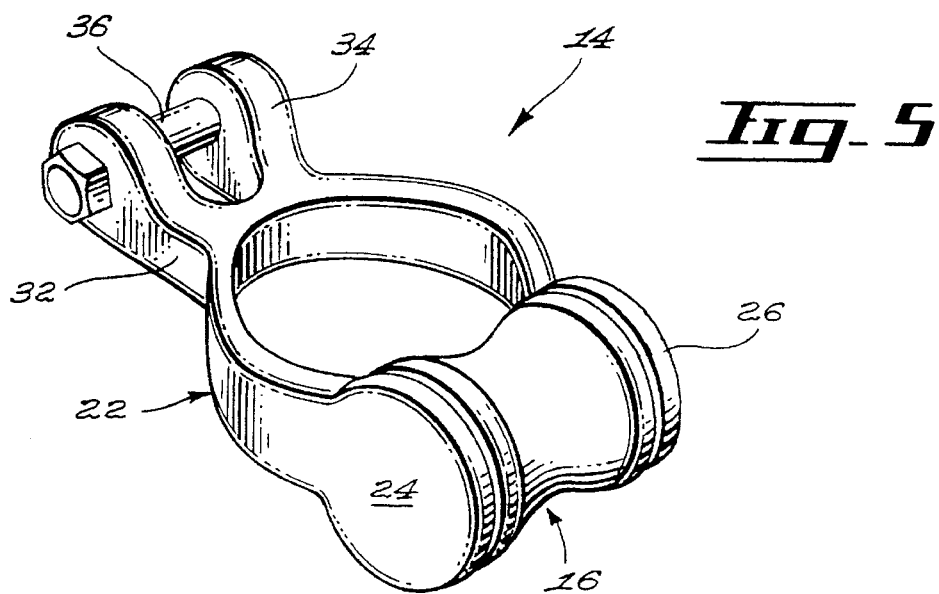
FIG. 5 is a perspective view of a pulley arrangement according to the present invention.
Figure 6:
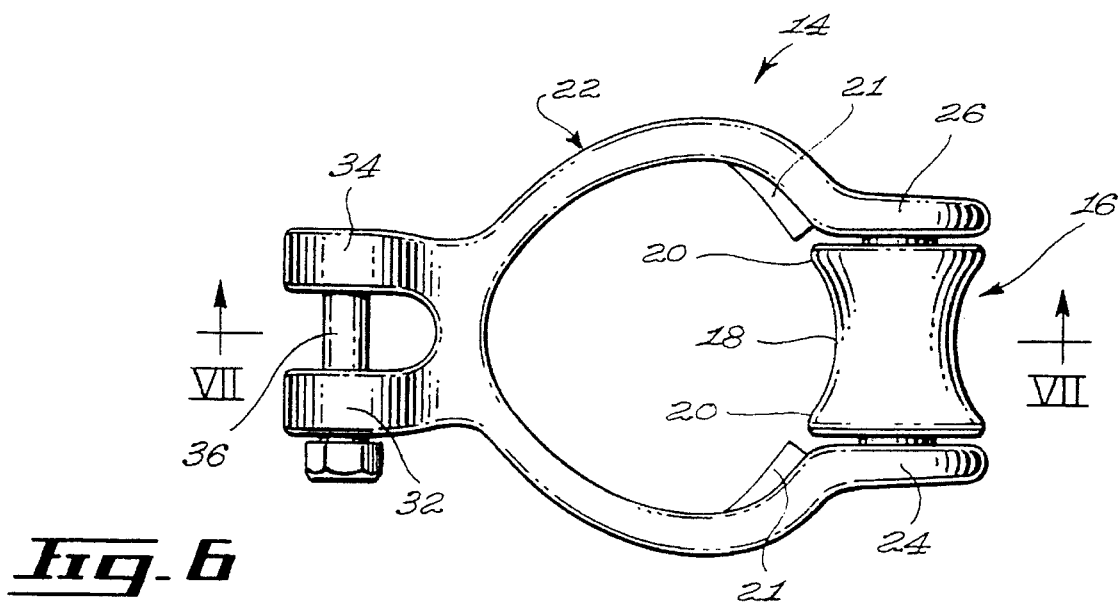
FIG. 6 is a top plan view thereof.
Figure 7:
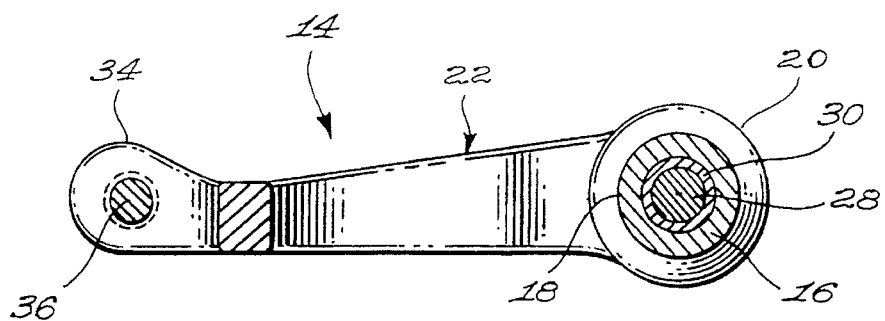
FIG. 7 is a sectional view taken along the lines 7—7 of FIG. 6.

The system includes a pulley member generally designated by the reference numeral 14 and which will not be referred to and is shown in FIGS. 5, 6 and 7. Pulley member or assembly 14 includes a sheave 16 having a central portion 18 for receiving a cable or the like and outwardly tapered side portions generally designated by reference numeral 20. A main frame or body 22 has a somewhat U shaped configuration and which terminates in side wall portions 24 and 26. Extending between side wall portions 24 and 26 is a shaft 28. Mounted on shaft 28 by means of a bearing 30 is sheave 16. In order to prevent any possibility of the line being caught between sheave 16 and the body, a pair of deflectors 21 may be formed on body 22 as seen in FIG. 6.

At the opposite end, pulley 14 has a pair of taps or ears 32 and 34. Extending between ears 32 and 34 is a bolt 36.

Figure 2:
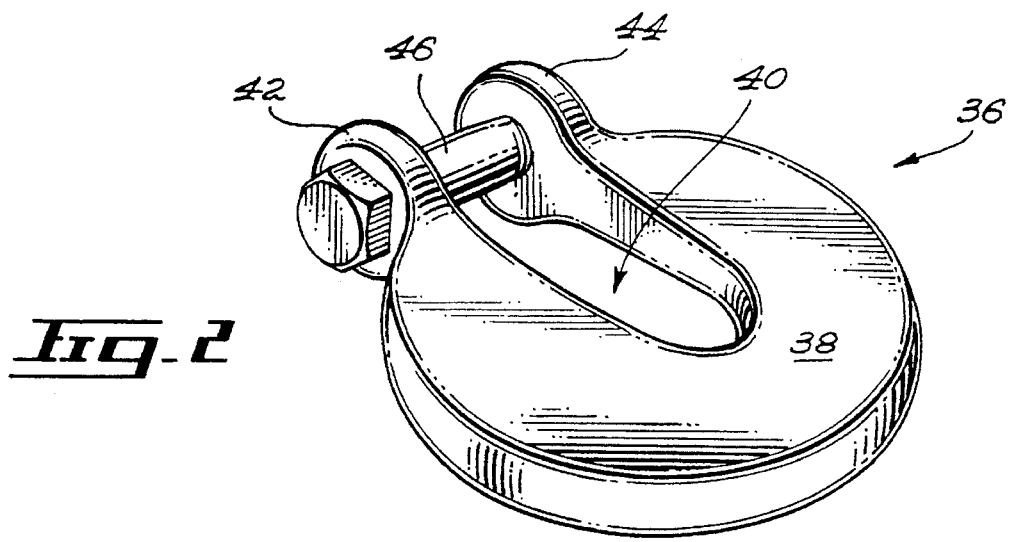
FIG. 2 is a perspective view of an end piece according to the present invention.
Figure 3:
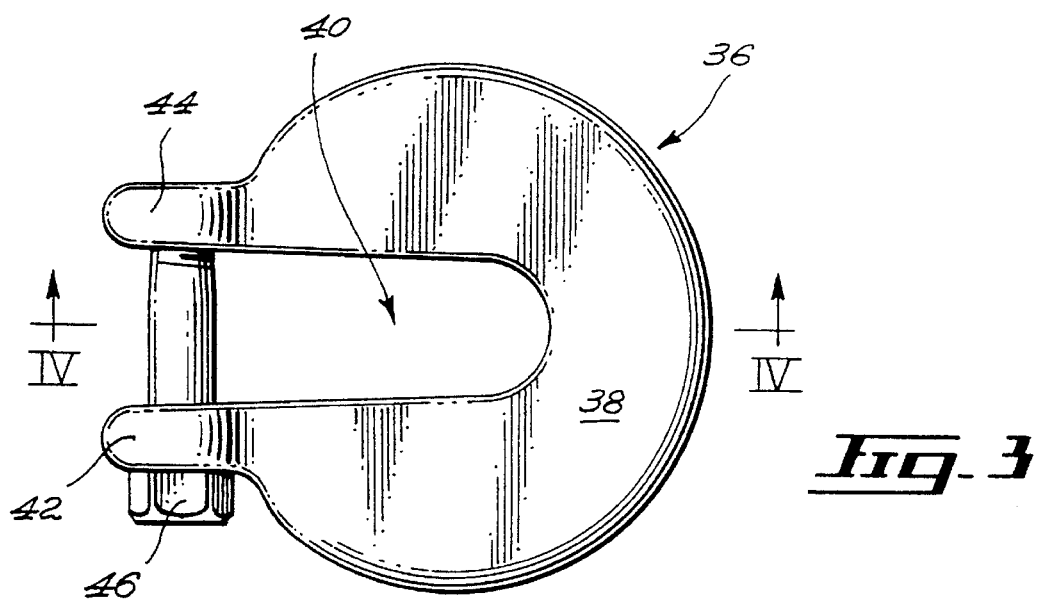
FIG. 3 is a top plan view of the end piece of FIG. 2.
Figure 4:
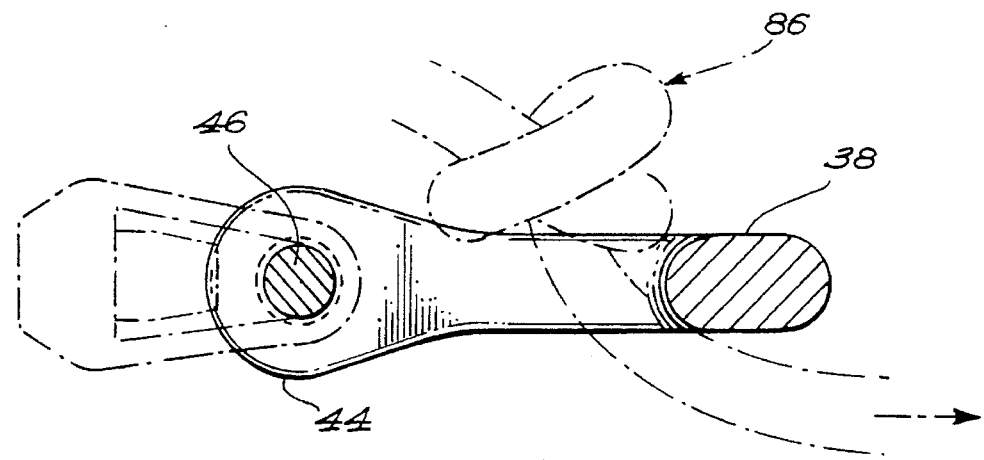
FIG. 4 is a sectional view taken along the lines 4—4 of FIG. 3.

The invention also contemplates the use of a special end piece and which end piece is illustrated in FIGS. 2, 3 and 4. End piece 36 has a substantially disk shaped body 38 having a U shaped aperture 40 formed therein. At one side of marginal edge of body 38, there is provided a pair of ears or lugs 42, 44 between which a suitable bolt 46 extends.

The system also includes a connecting member 48 for connecting the choker lines 12 and reference will now be made thereto. The connectors are shown in FIGS. 8, 9, 10 and 11.

Figure 8:
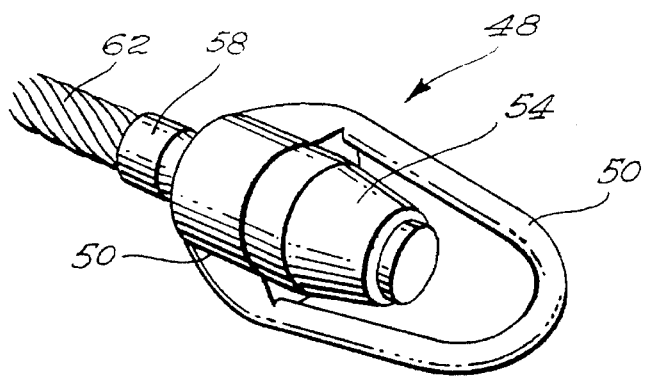
FIG. 8 is a perspective view of one embodiment of a connecting member for a choker line.
Figure 9:
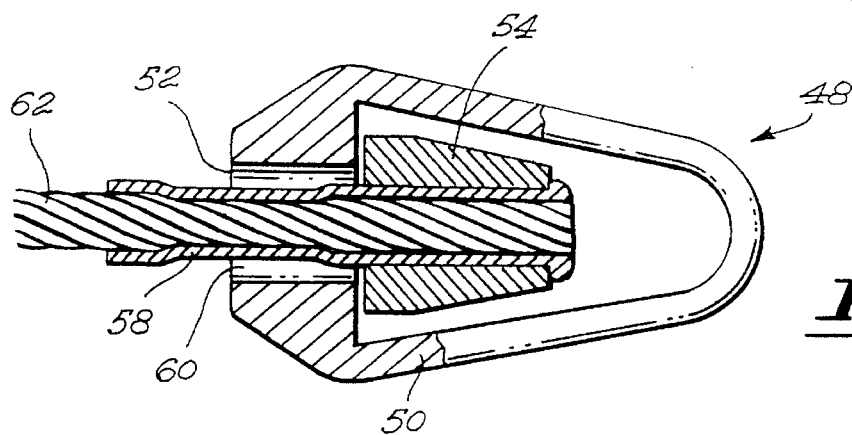
FIG. 9 is a sectional view thereof.

In one embodiment illustrated in FIGS. 8 and 9, the interconnecting member includes a trunnion 50 having aperture 52 formed in an end wall thereof. In the embodiment of FIGS. 8 and 9, choker wire 62 is of a substantially smaller dimension than the aperture 52. A sleeve 58 is clamped on wire 62 and subsequently, a locking element 54, which is larger than aperture 52, is clamped on sleeve 58 and wire 62. In this instance, a suitable bushing 60 is provided within aperture 52.

Figure 10:
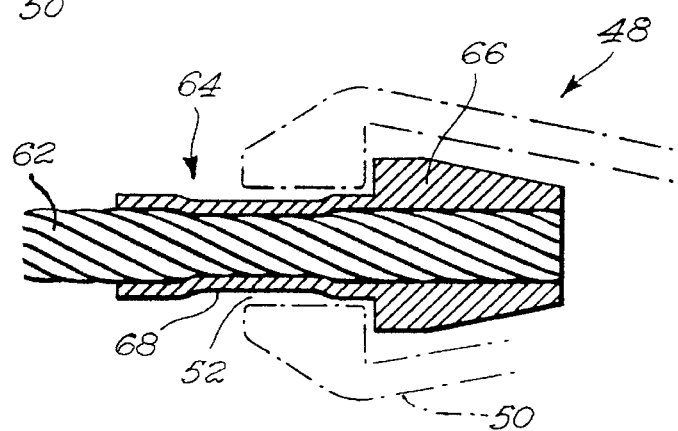
FIG. 10 is a sectional view similar to FIG. 9 of another embodiment thereof.

A slightly different arrangement is shown in FIG. 10 wherein locking element 64 is formed as a single piece and includes an enlarged head 66 and a sleeve portion 68 which fits within aperture 52 and is freely moveable therein. Sleeve portion 68 protects against wear of the wire 62.

Figure 11:
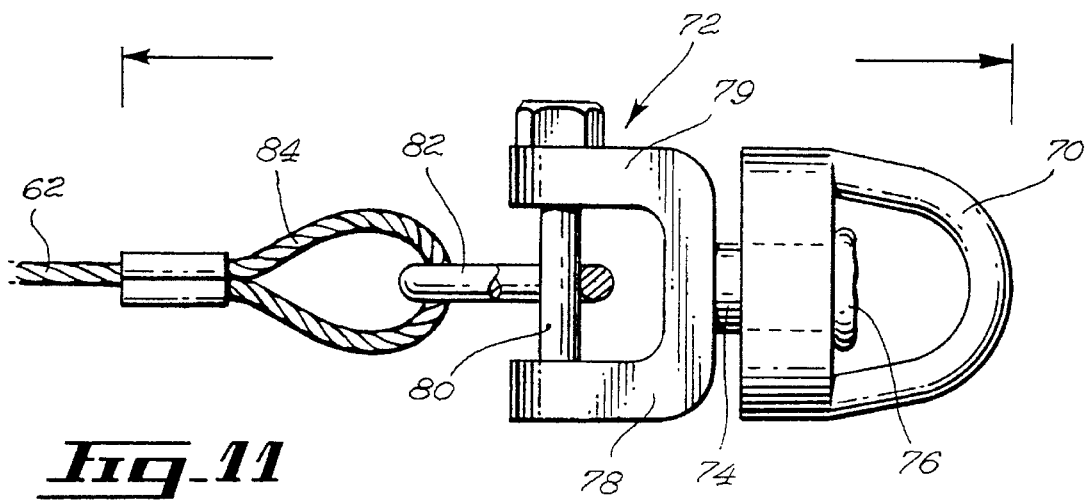
FIG. 11 is a side view of a further embodiment of a connecting assembly.

A somewhat less preferred embodiment is illustrated in FIG. 11 and will now be referred to. In this embodiment, there is provided a trunnion 70 associated with an interconnecting member 72. Interconnecting member 72 has a shaft 74 extending through an aperture in the base of trunnion 70; shaft 74 has an enlarged head portion 76. Interconnecting member 72 also includes a pair of opposed ears 78 and 79 between which bolt 80 extends. A suitable connector 82 is rotatable about bolt 80 and is connected to a loop 84 formed in choker wire 62.

As will be noted by the arrows, the embodiment in FIG. 11 has a length substantially greater than the embodiments described in FIGS. 8, 9 and 10 and therefore is somewhat less desirable for the purposes of the invention.

In operation, and as may be seen from FIG. 1, pulleys 14 are free to run along main line 10 due to sheave 16. In turn, connecting member 48 allows for movement between trunnion 50 and bolt or shaft 36. Movement is provided by means of rotatable movement of choker line cable wire 62 within trunnion 50. Thus, movement in all directions is permitted and accordingly, less breakage occurs.

End piece 36, as shown in FIG. 1, is attached to main line 10 by means of a knot 86. Moreover, end piece 36 also includes means for attaching a choker line 12 thereto—trunnion 50 can be attached to bolt or shaft 46. Even when breakage does occur, the fact that a choker line 12 is attached thereto allows for easy location of the line and end piece.

It will be understood that the above described embodiment is for purposes of illustration only and that changes and modifications may be made thereto without departing from the spirit and scope of the invention.

I claim:

1. A log hauling system consisting essentially of a main line, a plurality of choker lines, an interconnecting member connecting each choker line to said main line, each of said interconnecting members having a pulley at one end thereof adapted to run along said main line, an end piece located at an end of said main line, said end piece having first and second opposed surfaces, a channel formed in said end piece, said channel extending between said first and second opposed surfaces, said channel extending between a central portion of said end piece and an edge thereof, a moveable member extending across said channel adjacent said edge, said main line having a knotted portion adjacent said end piece, said channel being sized to permit passage of said main line therethrough and to prevent passage of said knotted portion, said channel also-being sized to permit passing of said main line through said channel when said moveable member is removed.

2. The system of claim 1 wherein each of said choker lines has an end member comprising a trunnion designed to connect to said interconnecting member, said trunnion being pivotable with respect to said interconnecting member, said trunnion having an aperture in a base thereof adapted to receive said choker line.

3. The system of claim 2 wherein said trunnion includes a bearing mounted about said choker line.

4. The system of claim 1 wherein each of said interconnecting members includes a shaft at an end opposed to said end having said pulley.

5. The system of claim 1 wherein said moveable member extending across said channel comprises a pole adapted to receive a choker line.

* * * * *